US006889109B1

(12) United States Patent
Solan et al.

(10) Patent No.: US 6,889,109 B1
(45) Date of Patent: May 3, 2005

(54) METHOD FOR MAINTAINING THE QUALITY OF PRODUCED PRODUCTS

(75) Inventors: Brendan Solan, Redford, MI (US); Chad E. Esselink, Canton, MI (US)

(73) Assignee: Ford Motor Company, Dearborn, MI (US)

( * ) Notice: Subject to any disclaimer, the term of this patent is extended or adjusted under 35 U.S.C. 154(b) by 451 days.

(21) Appl. No.: 09/706,063

(22) Filed: Nov. 3, 2000

(51) Int. Cl.[7] .................................................. G06F 7/06
(52) U.S. Cl. ........................ 700/115; 700/215; 700/225; 340/505; 705/28
(58) Field of Search ................................ 700/109, 114, 700/115, 214, 215, 219, 221, 222, 225; 340/505; 342/450, 457; 705/28; 702/81, 84, 188

(56) References Cited

U.S. PATENT DOCUMENTS

| | | | |
|---|---|---|---|
| 4,832,204 A | | 5/1989 | Handy et al. ................. 290/3.3 |
| 5,058,044 A | * | 10/1991 | Stewart et al. ............... 702/184 |
| 5,059,836 A | * | 10/1991 | Lee et al. .................... 327/557 |
| 5,119,104 A | | 6/1992 | Heller |
| 5,434,775 A | * | 7/1995 | Sims et al. ...................... 705/8 |
| 5,635,693 A | | 6/1997 | Benson et al. |
| 5,664,113 A | * | 9/1997 | Worger et al. ................. 705/28 |
| 5,798,693 A | | 8/1998 | Engellenner |
| 5,804,810 A | * | 9/1998 | Woolley et al. .............. 235/492 |
| 5,850,187 A | * | 12/1998 | Carrender et al. ......... 340/10.6 |
| 5,887,176 A | | 3/1999 | Griffith et al. |
| 5,920,287 A | | 7/1999 | Belcher et al. |
| 5,962,834 A | | 10/1999 | Markman |
| 6,014,628 A | | 1/2000 | Kovarik, Jr. |
| 6,263,278 B1 | * | 7/2001 | Nikiel et al. ................. 701/210 |
| 6,392,592 B1 | * | 5/2002 | Johnson et al. ........ 342/357.07 |
| 6,516,239 B1 | * | 2/2003 | Madden et al. ............. 700/115 |
| 6,560,579 B2 | * | 5/2003 | Soga et al. .................... 705/28 |
| 6,789,729 B1 | * | 9/2004 | Solan et al. ................. 235/375 |
| 2001/0037298 A1 | * | 11/2001 | Ehrman et al. ............... 705/40 |
| 2002/0022979 A1 | * | 2/2002 | Whipp et al. ................... 705/5 |

FOREIGN PATENT DOCUMENTS

| | | |
|---|---|---|
| GB | 2369819 A | 6/2002 |
| JP | 2000142926 A | 5/2000 |
| WO | WO 97/08628 | 3/1997 |
| WO | WO 97/50057 | 12/1997 |
| WO | WO 00/48016 | 8/2000 |
| WO | WO 00/70530 | * 11/2000 |

* cited by examiner

Primary Examiner—Paul Rodriguez
(74) Attorney, Agent, or Firm—David B. Kelley

(57) ABSTRACT

A method 10 for maintaining the quality of produced goods by selectively, automatically, and remotely identifying the location of the goods 11 within a storage facility 19, thereby allowing modifications to be efficiently made to the located goods 11 in order to maintain the quality of the goods 11.

13 Claims, 2 Drawing Sheets

METHOD FOR MAINTAINING THE QUALITY OF PRODUCED PRODUCTS

FIELD OF THE INVENTION

The present invention generally relates to a method for maintaining the quality of produced products and more particularly, to a method which allows products to be quickly and efficiently located within a storage facility in order to allow repairs or modifications to be made to these products before they are shipped to a customer or dealer.

BACKGROUND OF THE INVENTION

Products or items, such as and without limitation vehicles, are typically produced or created within a manufacturing plant or facility. The produced products are then typically driven or placed within a temporary storage yard or facility where they are selectively placed upon a railcar or other type of transport carrier or conveyance for shipment to a dealer or customer. Oftentimes, no record is kept of the initial location of each of these items within the yard. Further, no record is typically kept of the various locations that these items are respectively and later moved to or driven to within the yard, as new items are received. Hence, a manual search of the entire yard must usually be made in order to locate a particular item, should the item require service or repair prior to shipment.

Sometimes a plant or manufacturing facility will discover that previously manufactured items, including those items or products which have been placed within the storage yard for shipment, have an undesirable attribute or characteristic that must or should be corrected or repaired. Due to the relatively high cost of notifying customers of these needed modifications and the relatively high cost of having a dealer or other third party make these needed modifications, it is highly desirable to make these modifications to the products before they are shipped from the yard.

In the past, upon the discovery of such an undesirable attribute or characteristic, shipment from the yard was interrupted and/or stopped while the yard was manually searched for the items which were to be modified. Such an interruption caused an undesirable delay in shipping products, disrupted the entire product shipping schedule, and increased overall production cost, as the plant production schedule was similarly disrupted.

There is therefore a need for a method for maintaining the quality of manufactured items or products in a manner which overcomes at least some of the drawbacks of the previously delineated methods and for "containing" and rectifying undesirable attributes and/or characteristics of products before they are transported to customers and/or dealers of a business enterprise.

SUMMARY OF THE INVENTION

It is a first object of the present invention to provide a method for maintaining the quality of manufactured or produced items in a manner which overcomes at least some of the previously delineated drawbacks of prior methods.

It is a second object of the present invention to provide a method for maintaining the quality of manufactured or produced items in a manner which overcomes at least some of the previously delineated drawbacks of prior methods and which allows these items to be quickly and efficiently located within a storage yard or facility, effective to contain and rectify undesirable product attributes/characteristics.

According to a first aspect of the present invention, a method for maintaining the quality of an item is provided. The method comprises the step of placing the item within a certain facility; storing the location of the item; and using the stored location to retrieve the item and to make repairs to the item.

These and other features, aspects, and advantages of the present invention will become apparent from a reading of the following detailed description of the preferred embodiment of the invention and by reference to the following drawings.

DETAILED DESCRIPTION OF THE PREFERRED EMBODIMENT OF THE INVENTION

Figure 1:
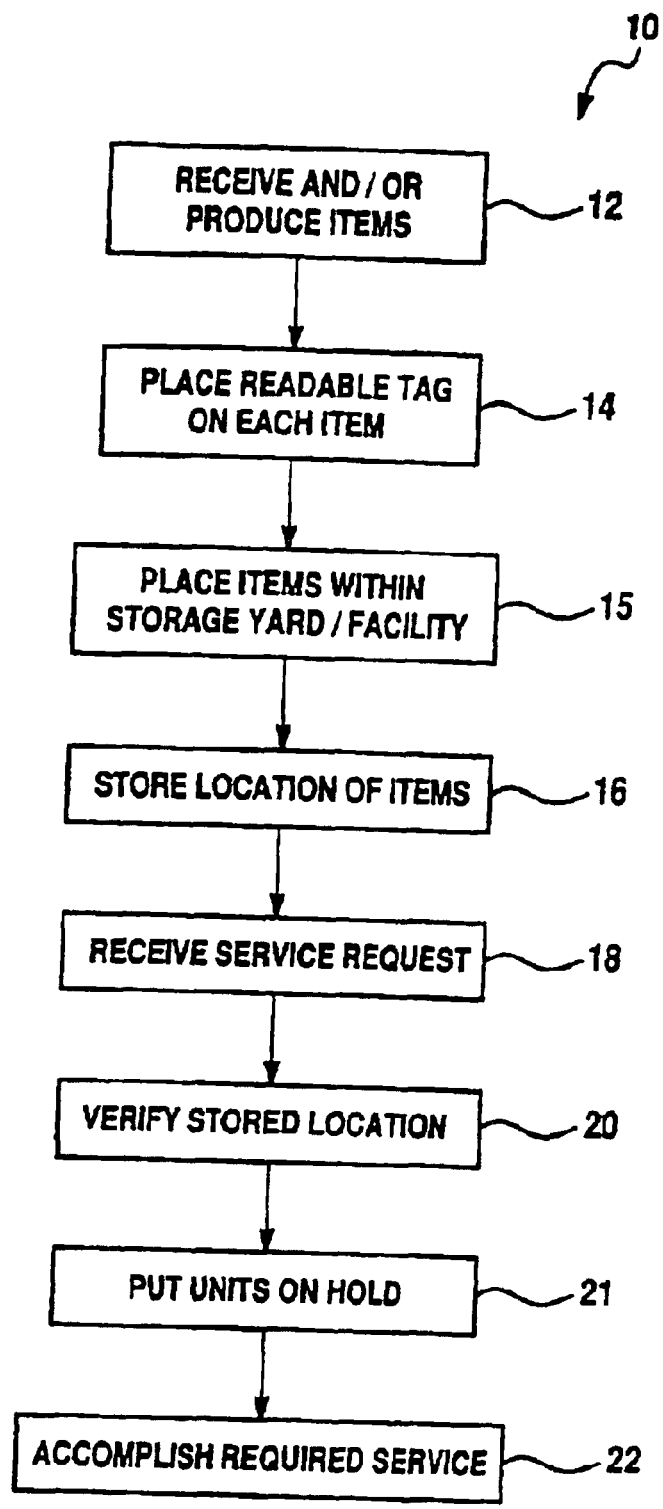
FIG. 1 is a flowchart which illustrates the methodology of the preferred embodiment of the invention.
Figure 2:
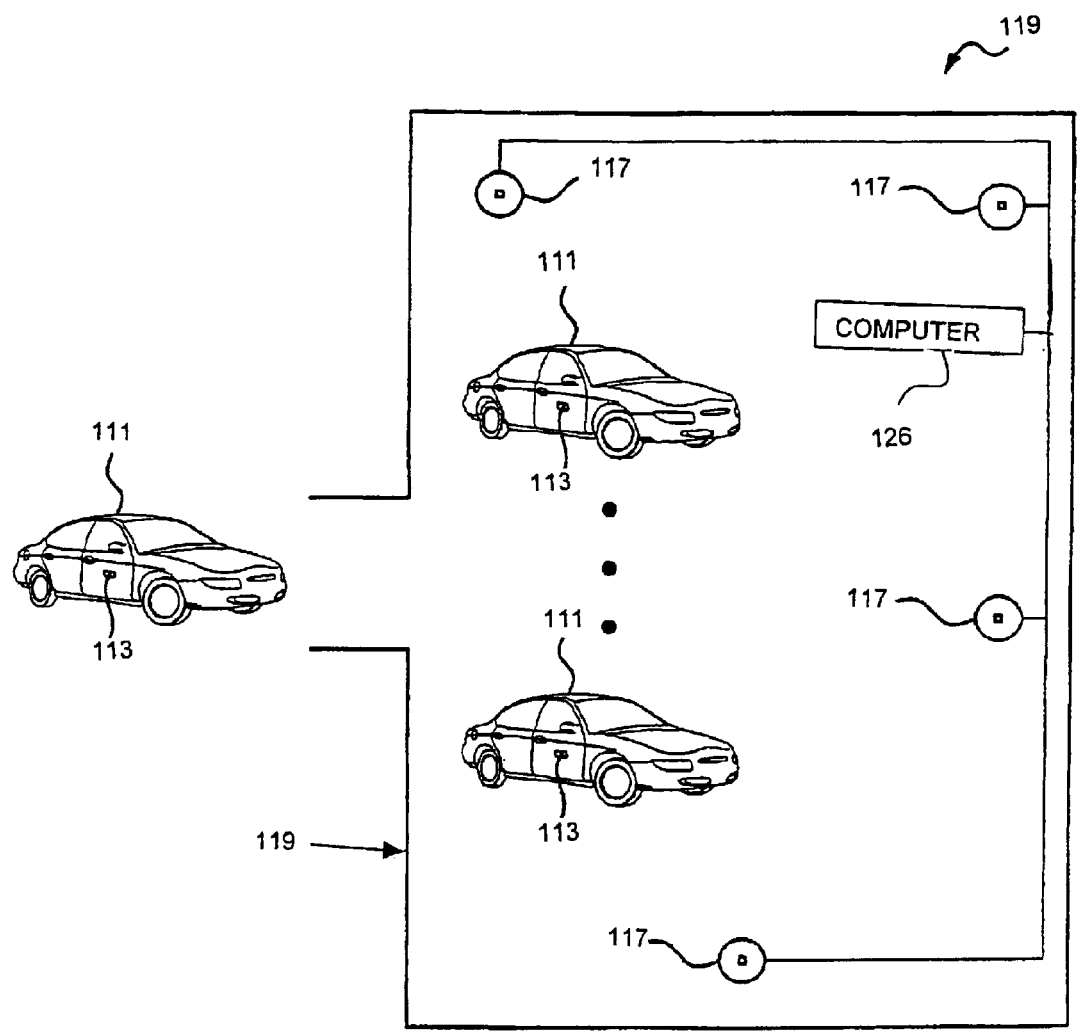
FIG. 2 is a block diagram of an item reception area which incorporates the methodology of the preferred embodiment of the invention.

Referring now to FIGS. 1 and 2, there is respectively shown a flowchart 10 which illustrates the methodology of the preferred embodiment of the invention and a block diagram of an item reception area which utilizes the methodology of the preferred embodiment of the invention.

As shown, the methodology includes a first step 12 which requires the receipt of and/or production or manufacture of certain items, such as vehicles 111 shown in FIG. 2. It should be appreciated that while the following discussion describes the use of the methodology of the preferred embodiment of the invention with vehicles 111, the methodology may be used with a wide variety of dissimilar items and nothing in the specifications should limit the scope of the invention to vehicles. Step 14 follows step 12 and, in this step, a selectively readable tag or tag assembly, such as tag or tag assembly 113, is placed upon each of the vehicles 111. Such a tag or assembly 113 may comprise, by way of example and without limitation, the electronic tags or devices described within U.S. Pat. No. 5,920,287 ("the '287 patent") which is fully and completely incorporated herein by reference. Each tag assembly 113 may also comprise the combination of such a tag 113 and a device or a member 117 which may selectively receive information and which is adapted to allow the received information to be selectively "read" or scanned by an optical or bar code reader type assembly (not shown). Tags 113 may also be selectively "read" or scanned by the use of the tag readers or reader assemblies which are described within the '287 patent. Such readers are generally shown as members or assemblies 117 within FIG. 2 of this Application. Step 15 follows step 14 and, in this step, the received items are placed within a storage yard or storage facility 119. The storage facility 119 similarly may selectively include the tracking and processing aspects and/or devices of the system which is more fully described within the '287 patent (e.g., the "RF processor system" and "asset management database"), including the computer shown at 126 of FIG. 2.

Step 16 follows step 15, and in this step, the location of each of the vehicles 111 is stored within a computer system 126. This step 16 may be accomplished by placing a unique and selectively readable identification number on and/or within each tag assembly 113 and separately interrogating each tag assembly 113 as the vehicles 111 respectively enter the yard or facility 119 and/or when they are stored at a certain respective initial location. In this manner, the respective identifying vehicle numbers and respective vehicle locations are obtained and placed within a computer database which may be contained within computer 126. Hence, each received vehicle 111 together with its respective initially stored location is contained within computer 126.

Step 18 follows step 16 and, in this step, a service request or need is communicated to personnel within the yard or storage facility 119 from the manufacturing plant (not shown), indicating that a certain and previously received vehicle 111 may require certain modifications and/or a certain group of previously received vehicles 111 may need certain service or repair. This need may also arise from those individuals residing within the storage yard or facility 119, or may emanate from various other sources (i.e., a component provider or manufacturer).

Step 20 follows step 18 and, in this step, the tags 113 are remotely and "dynamically" interrogated by the cooperative operation of members or assemblies 117 and computer 126 to verify the previously stored vehicle location and/or to determine the current location of a certain "targeted" vehicle 111 (i.e., a vehicle 111 requiring service), or certain group of targeted vehicles 111, thereby allowing the targeted vehicle(s) 111 to be quickly and efficiently accessed within the yard or storage facility, even if the vehicle(s) 111 have been moved from its and initially stored location. As used in this application, the term "dynamically" means that the respectively stored location of each of the vehicles 111 may be obtained even if these vehicles 111 have been moved from their respective and initial storage position within facility or yard 119 and without the need to manually search for these vehicles 111 within the facility or yard 119.

Step 21 follows step 20 and, in this step, the vehicles 111 or units in need of service are placed "on hold". In the preferred embodiment, the "on hold" status may be selectively placed into the respective tag 113 of any of the targeted vehicles 111 or units that are in need of service or repair, and is effective to substantially prevent these vehicles 111 or units from being shipped from the facility or yard 119. That is, personnel "reading" the tags 113 (i.e., by use of a scanner device) prior to vehicle shipment are automatically and/or electronically notified of the "on hold" status of the vehicles 111 and accordingly do not ship the vehicles 111. Alternatively, such an "on hold" status may be placed within a computer 126 or the previously delineated computer database and such "on hold" status may appear upon the screen or display portion of the computer 126. Step 22 follows step 21 and, in this step, the needed service is accomplished, thereby substantially preventing vehicles 111 having known and undesirable characteristics or attributes from being shipped. Once the service/repair has been performed on each of the targeted vehicles 111, the respective "on hold" status is removed or "deprogrammed" from the respective vehicle tags 113 and/or from the computer data base, thereby allowing the vehicles 111 to be transported from the facility or yard 119.

It is to be understood that the invention is not limited to the exact method and/or construction which has been previously described, but that various changes and modifications may be made without departing from the spirit and the scope of the invention as is more fully delineated in the following claims. Moreover, it should be realized that the foregoing method allows a business enterprise to maintain the overall quality of produced products and to contain and selectively rectify undesirable attributes and/or product characteristics within a temporary storage facility, before such products are shipped or transported to a customer or dealer.

What is claimed is:

1. A method of identifying and locating a vehicle to be repaired that is stored in a storage facility for storing vehicles prior to shipment, said method comprising the steps of:

receiving the vehicle at the storage facility for storing vehicles prior to shipment;

storing the vehicle within the storage facility at a stored location;

placing a selectively readable tag on the stored vehicle, wherein the selectively readable tag operatively identifies the stored location of the vehicle within the storage facility and a shipping status of the stored vehicle;

saving the stored location of the stored vehicle within the storage facility and the shipping status in a computer database operatively in communication with the selectively readable tag;

identifying a stored vehicle to be repaired using the computer database;

updating the shipping status of the stored vehicle to be repaired on the selectively readable tag and in the computer database to prevent shipment of the stored vehicle;

dynamically locating the stored vehicle to be repaired within the storage facility by operatively reading the selectively readable tag;

performing a repair on the stored vehicle to be repaired; and updating the shipping status of the repaired vehicle on the selectively readable tag and the computer database to release the repaired vehicle for shipment from the storage facility after the vehicle is repaired.

2. The method of claim 1 wherein the selectively readable tag is an electronic device having a receiving and transmitting means.

3. The method of claim 1 wherein said step of dynamically locating the stored vehicle to be repaired further includes the steps of selectively reading the selectively readable tag using a tag reading device operatively in communication with the computer database.

4. The method of claim 3 further comprising the steps of:

using a vehicle identification number assigned to the stored vehicle to identify the stored vehicle and electronically storing the vehicle identification number on the selectively readable tag to be read by the tag reading device.

5. The method of claim 1 wherein the shipping status is an indicator indicates of releasability of the stored vehicle from the storage facility.

6. The method of claim 1 further including the step of updating the selectively readable tag with the stored location of the vehicle within the storage facility if the stored vehicle is moved to another location within the storage facility.

7. The method of claim 1 wherein said step of dynamically locating the stored vehicle to be repaired further includes the steps of selectively reading the selectively readable tag from a remote location using a plurality of tag reading devices positioned within the storage facility that are operatively in communication with the computer database.

8. A method of identifying and locating a vehicle to be repaired that is stored in a storage facility for storing vehicles prior to shipment, said method comprising the steps of:

receiving the vehicle at the storage facility for storing vehicles prior to shipment;

storing the vehicle within the storage facility at a stored location;

placing a selectively readable tag on the stored vehicle, wherein the selectively readable tag is an electronic device having a receiving and transmitting means that operatively identifies the location of the stored vehicle within the storage facility and a shipping status of the stored vehicle;

saving the stored location of the stored vehicle within the storage facility and the shipping status in a computer database operatively in communication with the selectively readable tag, wherein the shipping status indicates availability of the stored vehicle for shipment;

identifying a stored vehicle to be repaired using the computer database;

dynamically locating the stored vehicle to be repaired within the storage facility by remotely reading the selectively readable tag using a tag reading device;

updating the shipping status of the stored vehicle to be repaired on the selectively readable tag and in the computer database to prevent shipment of the stored vehicle to be repaired;

performing a repair on the stored vehicle to be repaired; and updating the shipping status of the repaired vehicle on the selectively readable tag and the computer database to release the repaired vehicle for shipment after the vehicle is repaired.

9. The method of claim 8 further comprising the steps of:

using a vehicle identification number assigned to the stored vehicle to identify the stored vehicle and electronically storing the vehicle identification number on the selectively readable tag to be read by the tag reading device.

10. The method of claim 8 wherein said step of dynamically locating the stored vehicle to be repaired further includes the steps of selectively reading the selectively readable tag from a remote location using a plurality of tag reading devices positioned within the storage facility that are operatively in communication with the computer database.

11. The method of claim 8 further including the step of updating the stored location of the stored vehicle within the storage facility if the stored vehicle is moved to another location within the storage facility.

12. A method of identifying and locating a vehicle to be repaired that is stored in a storage facility for storing vehicles prior to shipping, said method comprising the steps of:

positioning at least one tag reading device within the storage facility for storing vehicles prior to shipping;

receiving the vehicle at the storage facility;

storing the vehicle within the storage facility at a stored location;

placing a selectively readable tag on the stored vehicle, wherein the selectively readable tag is an electronic device having a receiving and transmitting means that operatively identifies the location of the stored vehicle within the storage facility;

using a vehicle identification number assigned to the stored vehicle to identify the stored vehicle and electronically storing the vehicle identification number on the selectively readable tag so that it is readable by the at least one tag reading device;

assigning a shipping status indicator to the stored vehicle that is electronically stored on the tag and readable by the tag reading device, wherein the shipping status indicator indicates releasability of the stored vehicle from the storage facility;

saving the stored location of the stored vehicle within the storage facility and the shipping status indicator in a computer database operatively in communication with the selectively readable tag;

identifying a stored vehicle to be repaired using the computer database;

dynamically locating the stored vehicle to be repaired within said storage facility by remotely reading the selectively readable tag using the at least ore tag reading device;

updating the shipping status indicator of the stored vehicle to be repaired on the selectively readable tag and in the computer database to prevent shipment of the stored vehicle to be repaired;

performing a repair on the stored vehicle to be repaired;

updating the shipping status indicator electronically stored on the selectively readable tag and in the computer database after the stored vehicle to be repaired is repaired; and releasing the stored vehicle to be repaired for shipment from the storage facility after the vehicle is repaired.

13. The method of claim 12 further including the step of updating the stored location of the stored vehicle within the storage facility if the stored vehicle is moved to another location within the storage facility.

* * * * *